United States Patent
Litvin et al.

(10) Patent No.: US 7,783,197 B2
(45) Date of Patent: Aug. 24, 2010

(54) METHOD AND APPARATUS FOR REDUCING CROSSTALK IN A DWDM TRANSMISSION SYSTEM

(75) Inventors: Kerry Litvin, Huntingdon Valley, PA (US); Michael Aviles, Mount Laurel, NJ (US); Shawn Esser, Blue Bell, PA (US)

(73) Assignee: General Instrument Corporation, Horsham, PA (US)

( * ) Notice: Subject to any disclaimer, the term of this patent is extended or adjusted under 35 U.S.C. 154(b) by 440 days.

(21) Appl. No.: 11/751,997

(22) Filed: May 22, 2007

(65) Prior Publication Data

US 2008/0292316 A1 Nov. 27, 2008

(51) Int. Cl.
*H04J 14/02* (2006.01)
(52) U.S. Cl. ............... 398/81; 398/69; 398/79
(58) Field of Classification Search .......... 598/69, 598/81, 79
See application file for complete search history.

(56) References Cited

U.S. PATENT DOCUMENTS

| | | | |
|---|---|---|---|
| 5,546,210 A * | 8/1996 | Chraplyvy et al. ........ 398/79 |
| 6,118,561 A * | 9/2000 | Maki ........................ 398/1 |
| 6,205,268 B1 | 3/2001 | Chraplyvy et al. |
| 6,377,375 B1 * | 4/2002 | Taga et al. ................ 398/92 |
| 6,577,414 B1 | 6/2003 | Feldman et al. |
| 6,636,658 B2 | 10/2003 | Goodman et al. |
| 6,788,833 B1 | 9/2004 | Brisson et al. |
| 2002/0067525 A1 * | 6/2002 | Sakamoto et al. ......... 359/124 |
| 2005/0152025 A1 | 7/2005 | Hainberger et al. |
| 2005/0152654 A1 | 7/2005 | Puzey |
| 2006/0165413 A1 * | 7/2006 | Schemmann et al. ...... 398/71 |
| 2006/0193556 A1 | 8/2006 | Frisken |
| 2006/0285197 A1 | 12/2006 | McKinstrie |
| 2009/0185804 A1 * | 7/2009 | Kai et al. ................. 398/48 |

* cited by examiner

*Primary Examiner*—Leslie Pascal
(74) *Attorney, Agent, or Firm*—Larry T. Cullen

(57) ABSTRACT

A method and apparatus is provided for transmitting a WDM optical signal. The method begins by modulating a plurality of optical channels that are each located at a different wavelength from one another with a respective one of a plurality of information-bearing electrical signals The channel spacings between adjacent ones of the plurality of optical channels are selected such that the optical channels give rise to selected FWM terms that lie outside a channel bandwidth of the optical channels. Each of the modulated optical channels is multiplexed to form a WDM optical signal. The WDM optical signal is then forwarded onto an optical transmission path.

28 Claims, 7 Drawing Sheets

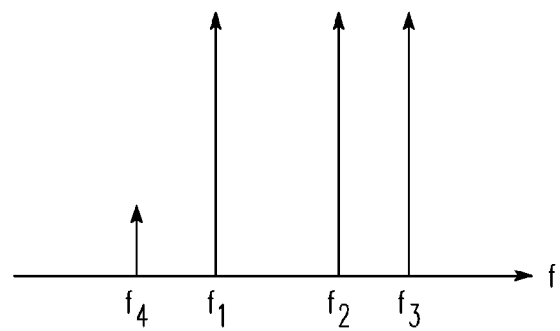
FIG. 1
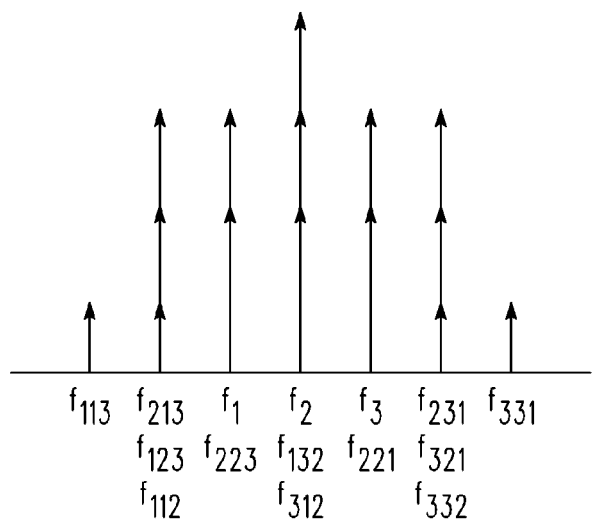
FIG. 2
FIG. 3
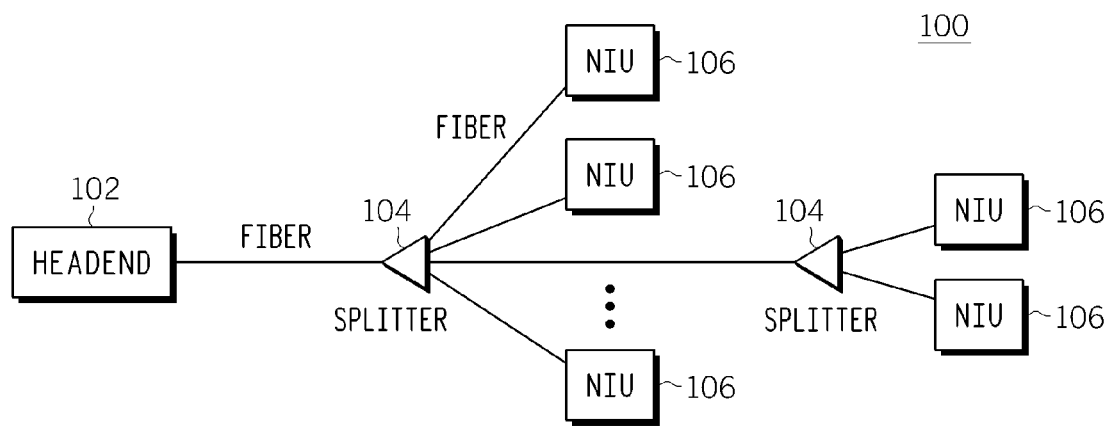

METHOD AND APPARATUS FOR REDUCING CROSSTALK IN A DWDM TRANSMISSION SYSTEM

FIELD OF THE INVENTION

The invention relates generally to the transmission of wavelength division multiplexed (WDM) optical signals, and more particularly to a method and apparatus for reducing nonlinear signal distortions induced by four wave mixing (FWM) interactions between the optical channels.

BACKGROUND OF THE INVENTION

MSOs (multi-service operators) of cable television (CATV) systems provide several services to end users through a fiber optic network, with the final connection to the user often being through a coaxial connection. The services provided by the MSO typically include broadcast analog video and narrow cast digital services, such as data, VoIP, subscription, pay per view and video on demand (VOD) services. The services are generally allocated to a portion of an optical channel, which typically has approximately 1 GHz of available bandwidth. While the bandwidth of a channel is generally constrained by the optical network (the optical network transmitters, optical fiber, channel filter bandwidths and coaxial connection), the number of users connected to the optical network continues to increase, which requires increased demand for bandwidth for the desired services.

In recent years wavelength division multiplexed (WDM) optical transmission systems have been increasingly deployed in optical networks. These include coarse wavelength division multiplexed (CWDM) and dense wavelength division multiplexed (DWDM) systems. Whether a system is considered to be CWDM or DWDM simply depends upon the optical frequency spacing of the channels utilized in the system. Although WDM optical transmission systems have increased the speed and capacity of optical networks, the performance of such systems is limited by various factors such as chromatic dispersion and the fiber nonlinearity, which can cause pulse shape changes in the case of baseband digital signals and distortions in case of analog signals. These impairments degrade the quality of the optically transmitted information. Fiber nonlinearities, for example, can give rise to the generation of undesirable optical signals whose wavelengths fall within the filter passbands of the various channels within the system. If the power levels of these undesirable signals are sufficiently large they will corrupt the information being transmitted by the optical signals that are impacted by these impairments.

One common nonlinear impairment in an optical fiber communication system having multiple wavelengths is four wave mixing (FWM). The FWM process is also known by other names such as parametric interactions. Parametric interactions, or FWM, occur when the photons comprising the desired optical signals of a system elastically scatter in a silica fiber (and other materials). The material comprising the optical fiber acts as catalyst for elastic scattering. During the course of elastic scattering events incident photons interact with the propagation medium (the optical fiber material) through collisions with the material. The scattering event is elastic because none of the optical energy transported by the incident photons is lost to the fiber itself. This is unlike Raman scattering, which is an inelastic scattering process with some of the optical energy being lost to the transmission medium. Instead, the incident photons' energy is instantaneously converted back into optical energy. The scattered photons' energy may or may not be at the original frequencies of the incident photons that initiated the elastic scattering event. Both energy and momentum are conserved during the elastic scattering event:

$$\hbar\omega_1 + \hbar\omega_2 = \hbar\omega_3 + \hbar\omega_4 \text{ and } \hbar\vec{k}_1 + \hbar\vec{k}_2 = \hbar\vec{k}_3 + \hbar\vec{k}_4,$$

where $\omega_i$ is the frequency of the $i^{th}$ signal and $k_i$ is its associated wavevector, $\hbar$ is Planck's constant divided by $2\pi$. As a result of the scattering event two photons are annihilated and two other photons are created. If the energy relationship is rearranged it becomes clear how three co-propagating waves interact to create a fourth signal: $\omega_1 + \omega_2 - \omega_3 = \omega_4$. The fourth signal at $\omega_4$ is a new signal that was not originally present in the system at the transmitter launch site. The signal at $\omega_4$ is created as a result of the inelastic scattering events (four wave mixing processes) occurring within the optical fiber. The fourth signal at $\omega_4$ is the undesirable nonlinear impairment. If $\omega_4$ is too close in frequency to one of the original signals (i.e. one of the DWDM channels) it can potentially interfere with and corrupt the information being transmitted by the desired signal in its vicinity. The consequence of momentum conservation is that the four wave mixing terms are largest under conditions when the dispersion is smallest amongst the interacting optical signals. This situation arises when the optical DWDM signals are located near the zero dispersion point of the optical fiber (i.e. in the vicinity of 1311 nm for ordinary single mode optical fiber) or when the signals are closely spaced together (i.e. when the signals are spaced at distances of 100 GHz or less). In the case of a near zero dispersion system the optical pump and signal waves are propagating at nearly identical group velocities through the media. The zero dispersion wavelength of a transmission media refers to the wavelength at which an optical signal will have no change in (inverse) group velocity with respect to changes in its optical frequency. The zero dispersion wavelength differs for different transmission media. The dispersion will generally increase as the wavelength difference between the optical signal and the zero dispersion wavelength increases. However if the signals are closely spaced in frequency the difference will not be great enough to disrupt the conservation of momentum requirement to any great degree.

As noted above, four-wave mixing is a nonlinear process in which the interaction of three fields leads to the generation of a fourth field. That is, FWM is the induced combination of three wavelengths to produce one or more new wavelengths. Two of the three combining wavelengths can be degenerate such that two wavelengths are combined to produce one or more new wavelengths. Optical power is removed from the combining wavelengths and transferred to the new wavelengths in the FWM process. FWM is especially problematic in optical communications if the new wavelengths produced by the FWM process overlap the assigned wavelengths of existing DWDM channels because it is difficult to distinguish between the legitimate optical data signals at these existing WDM channels and the error signal superimposed thereon as the result of FWM. Therefore, it is important to suppress FWM.

FIG. 1 illustrates the four-wave mixing process. If three signals at frequencies f1, f2, and f3 propagate through a single mode fiber, light at a frequency f4=f1+f2−f3 will be generated. If any two of the frequencies are identical the FWM process is referred to partially degenerate and if all three frequencies are identical the FWM process is referred to as totally degenerate. More generally, in a system with N channels, three signals at frequencies fi, fj and fk produce signals at frequencies fi±fj±fk, where i, j and k vary from 1 to N. This results in $N^2(N-1)/2$ interfering signals. FIG. 2 shows an example with three channels, which produce 12 interfering terms.

Optical WDM networks typically allocate a portion of the spectrum about a center frequency of the nominal channel wavelength for signal transmission. Two different optical wavebands or windows are commonly utilized, one centered around a wavelength of about 1310 nm and another centered around a wavelength of about 1550 nm. Signals operating in the 1310 nm window typically occupy wavelengths between about 1280 nm and 1330 nm, whereas signals operating in the 1550 nm window typically occupy wavelengths between about 1530 and 1565 nm. In dense wavelength division multiplexing (DWDM) systems, channel spacings of less than 1 nm are typically used with wavelength bands centering usually centered around 1550 nm. In the 1550 nm window, the International Telecommunication Union (ITU) specifies a DWDM standard using 100 GHz or 200 GHz spacing between signal wavelengths, which is equivalent to 0.8 nm and 0.4 nm, respectively.

The widely used optical wavelengths in a typical CATV application, e.g. those in the 1310 nm window, exhibit little relative dispersion between adjacent ITU frequencies, and hence are particularly affected by the FWM effect when used in a DWDM system. For this reason CATV MSOs have been generally prevented from using a DWDM approach to increase bandwidth because of the degradation of the signal quality from FWM interactions. As a result, in order to meet the increased demand for additional bandwidth, CATV MSOs may be required to install more optical fiber to carry additional channels, and then segment their subscriber base between the newly installed optical fiber and the existing fiber. However, this approach requires a significant capital investment for the MSOs and often involves the negotiation of additional access rights to install the optical fiber. Alternatively, the CATV MSOs may use other wavelengths which are less affected by FWM such as those in the 1550 nm window. However use of these wavelengths require more expensive optical components, e.g. lasers and nodes, significant changes to their existing optical network and significant capital investment as well. Hence it remains desirable to operate DWDM systems in the 1310 nm window for a number of reasons. This is primarily because systems operating in the 1310 nm window are generally simpler and less expensive to implement than systems operating in the 1550 nm window. For example, laser transmitters operating in the 1310 nm window are significantly less expensive than lasers operating in the 1550 nm window. Moreover, because of the higher dispersion in the 1510 nm window, additional components such as dispersion compensators are often needed when operating in the 1550 nm window.

Accordingly, it is desirable to reduce the levels of FWM distortions that arise among the individual channels in a DWDM optical system. This is particularly true in the case of a system utilizing optical channels that are located near the zero dispersion wavelength of the transmission medium.

SUMMARY OF THE INVENTION

In accordance with the present invention, a method and apparatus is provided for transmitting a WDM optical signal. The method begins by modulating a plurality of optical channels that are each located at a different wavelength from one another with a respective one of a plurality of information-bearing electrical signals The channel spacings between adjacent ones of the plurality of optical channels are selected such that the optical channels give rise to selected FWM terms that lie outside a channel bandwidth of the optical channels. Each of the modulated optical channels are multiplexed to form a WDM optical signal. The WDM optical signal is then forwarded onto an optical transmission path.

In accordance with one aspect of the invention, the selected FWM terms may include completely non-degenerate FWM products.

In accordance with another aspect of the invention, the channel spacings between each channel i and its adjacent channel may be equal to a constant frequency offset plus a frequency offset $\delta f_i$, wherein the frequency offset $\delta f_i$ is $$\delta f_i \equiv a_i \frac{B}{2},$$

where $B/2$ is a minimum acceptable frequency separation and $a_i$ is a scaling factor that satisfies the inequality conditions $|a_m + a_{(i+j-m)} - a_i - a_j| > 1$ where $1 \leq i+j-m \leq n$ $m \neq i \neq j$, n is the number of optical channels, and i and j are indices denoting any of the optical channels between channel 1 and channel n, which, along with a given one of the optical channels m, produce the selected FWM terms.

In accordance with another aspect of the invention, $a_1$ may be equal to zero.

In accordance with another aspect of the invention, the scaling factor $a_i$ may satisfy only unique ones of the inequality conditions $|a_m + a_{(i+j-m)} - a_i - a_j| > 1$.

In accordance with another aspect of the invention, all values of the scaling factor $a_i$ may be equal to zero or a positive integer.

In accordance with another aspect of the invention, B may be equal to the channel bandwidth of the optical channels.

In accordance with another aspect of the invention, the optical transmission path may be located in a HFC network.

In accordance with another aspect of the invention, the optical transmission path may be located in a CATV transmission network.

In accordance with another aspect of the invention, the optical transmission path may be located in a PON.

In accordance with another aspect of the invention, the optical channels may be located at wavelengths at or near a zero dispersion wavelength of the transmission path.

In accordance with another aspect of the invention, the optical channels may be centered about a wavelength of 1310 nm.

In accordance with another aspect of the invention, the optical channels may be centered about a wavelength of 1550 nm.

In accordance with another aspect of the invention, a method and apparatus is provided for determining the frequencies of optical channels in a WDM system. The method begins by selecting an initial set of channel spacings between at least three optical channels to be employed in the WDM system. The initial set of channel spacings are adjusted so that the optical channels give rise to completely non-degenerate FWM products that lie outside a channel bandwidth of each of the optical channels.

In accordance with another aspect of the invention, a WDM optical transmitter is provided. The transmitter includes a plurality of optical sources for generating optical channels located at different wavelengths. The transmitter also includes a plurality of optical modulators each having a first input for receiving a respective one of a plurality of information-bearing electrical signals and an output coupled to an input of a respective one of the plurality of optical sources to thereby provide a plurality of modulated optical channels. The channel spacings between adjacent ones of the plurality of optical channels are selected such that the optical channels give rise to selected FWM terms that lie outside a channel bandwidth of the optical channels. A multiplexer is coupled to the plurality of optical sources to receive and combine the modulated optical channels to produce a multiplexed optical signal.

BRIEF DESCRIPTION OF THE DRAWINGS

FIG. 1 illustrates the four-wave mixing process in which signals at frequencies f1, f2, and f3 generate a FWM term or product at a frequency f4.

FIG. 2 shows an example of the FWM process in which three optical channels produce 12 interfering terms, including degenerate interfering terms.

FIG. 3 shows the system architecture of a passive optical network (PON).

DETAILED DESCRIPTION

Figure 4:
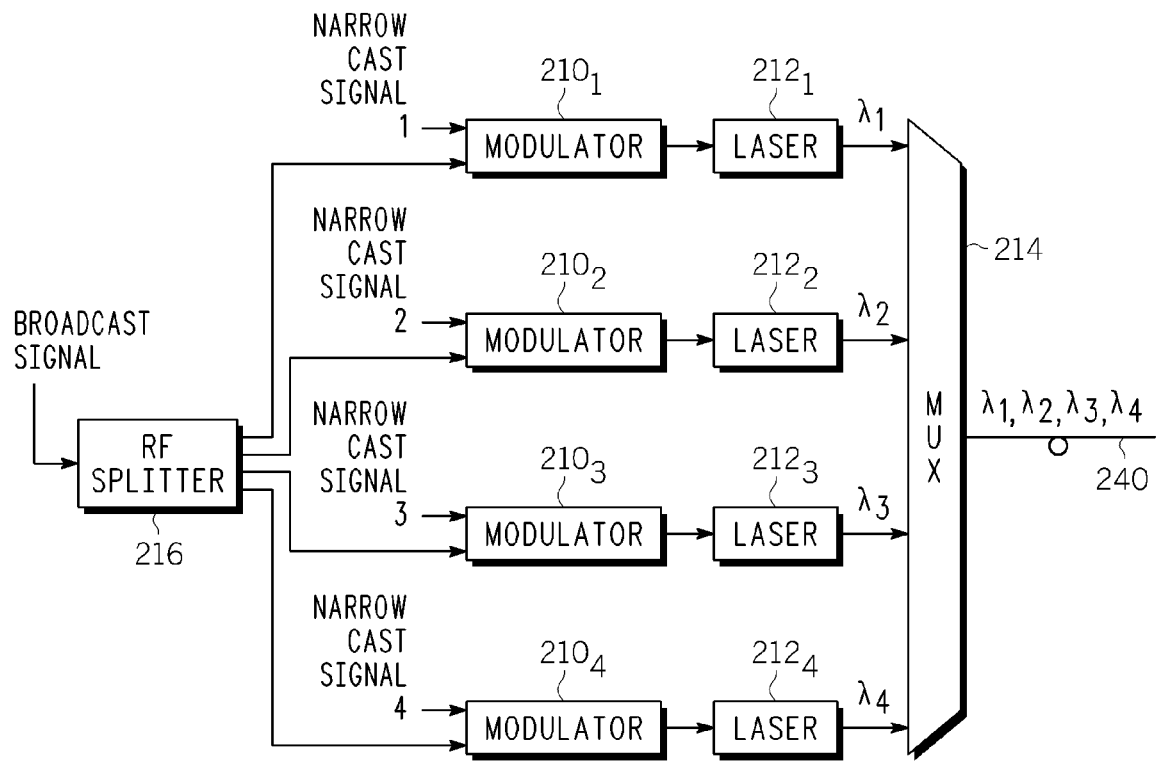
FIG. 4 shows a simplified block diagram of a WDM transmitter that may be employed in a WDM system such as the PON depicted in FIG. 3.

A method and system is described herein for the suppression of nonlinear signal distortions associated with the propagation of a dense wavelength-division multiplexed (DWDM) optical signal. The particular nonlinear signal distortions that are addressed include four-wave mixing (FWM). Although the concepts described herein will be described within the context of a cable television (CATV) network, the techniques may be advantageously employed within various other networks or systems wherein the suppression of nonlinear effects associated with the propagation of an optical signal is desirable. Such networks include, without limitation, various all-optical networks, hybrid fiber-coax (HFC) networks, fiber deep networks, and networks utilizing a passive architecture, which are often referred to as Passive Optical Networks (PONs).

In typical HFC architectures, a broadcast signal is split at optical hubs and then sent to different nodes together with narrowcast signals. At the fiber node the optical signal is converted into an electronic signal, and carried over multiple coax buses for distribution throughout a neighborhood. On the other hand, in a PON architecture, fibers carry signals from an optical line terminator (OLT) to optical splitters, and further to optical-network units (ONUs), where optical-to-electronic conversion takes place. In the case of PON architectures, broadcast and narrowcast signals are sent in a similar manner. Both HFC and PONs generally carry the same downstream signals to multiple customers. In both networks multiple paths are typically used beyond the first node. Use of WDM in a fiber to a node allows further and more node segmentations.

As previously mentioned, crosstalk arising from four-wave mixing is particularly problematic at low dispersions. This result occurs because FWM depends on the phase relationship between the interacting signals (momentum conservation). If all the interfering signals travel with the same group velocity, as would be the case if there were no dispersion, the effect of FWM is reinforced. On the other hand, with dispersion present, the different signals travel with different group velocities. Thus, with increasing dispersion, the different wavelengths alternatively overlap in and out of phase and the net effect is to reduce the mixing efficiency.

Commonly available optical fiber operating in the 1310 nm window has a zero-dispersion wavelength at about 1310 nm. That is, signals traveling in such fibers at wavelengths in the vicinity of 1310 nm experience little or no dispersion, thus increasing the adverse effects of FWM. Nevertheless, DWDM systems operating in the 1310 nm window remain desirable for the previously enumerated reasons. While the concepts and techniques describing herein are thus particularly applicable to networks that operate in the 1310 nm window. However, they are also applicable to networks that operate in other wavebands such as the 1500 nm, window, for example.

FIG. 3 shows the architecture of a PON in its most generalized form. The PON 100 includes a hub 102, remote nodes 104 that are deployed in the field, and network interface units (NIUs) 106. The hub 102, remote nodes 104 and NIUs 106 are in communication with one another over optical fiber links. If the PON 100 is used in a CATV network, hub 102 is a headend, whereas in a telecommunications network, hub 102 is a central office. The NIUs 106 may be terminal equipment located on the customer premises or they may serve multiple customers, in which case the NIUs 106 simply provide another level in the network hierarchy below the remote nodes. A primary advantage of a BPON is its reliability, ease of maintenance and the fact that the field-deployed network does not need to be powered. Accordingly, PONs are often used as access networks by cable TV in CATV networks and telecommunications providers for the purpose of distributing their services from their facility to the customer premises (e.g., a home or business). One example of a PON is sometimes referred to as a Broadband PON (BPON), which is a combination of a PON with wavelength division multiplexing (WDM) for downstream and upstream signals. The WDM techniques can be used for downstream signals and allow different optical wavelengths to support broadcast and multiple narrowcast (dedicated for each wavelength) transmissions on the fiber employed in the BPON.

FIG. 4 shows a simplified block diagram of one example of a WDM transmitter 200 that may be employed in a WDM or DWDM system. For example, the transmitter 200 may be employed in the hub or headend 102 of the network shown in FIG. 3. In operation, data or other information-bearing signals are applied to the inputs of modulators $210_1$, $210_2$, $210_3$, and $210_4$. The modulators $210_1$, $210_2$, $210_3$, and $210_4$, in turn, drive lasers $212_1$, $212_2$, $212_3$, and $212_4$, respectively. Lasers $212_1$, $212_2$, $212_3$, and $212_4$ generate data modulated optical channels at signal wavelengths $\lambda_1$, $\lambda_2$, $\lambda_3$ and $\lambda_4$, respectively, where $\lambda_4 > \lambda_3 > \lambda_2 > \lambda_1$. A wavelength division multiplexer (WDM) 214 receives the optical channels and combines them to form a WDM optical signal that is then forwarded onto a single optical transmission path 240. While the WDM transmitter shown in FIG. 4 multiplexes four optical channels onto a single path, those of ordinary skill in the art will recognize that any number of optical channels may be multiplexed in this manner. As shown, in the context of a CATV network, optical channels $\lambda_1$, $\lambda_2$, $\lambda_3$ and $\lambda_4$ may be broadcast signals that all contain the same video signals, plus narrowcast signals that are different for different optical channels of $\lambda_1$, $\lambda_2$, $\lambda_3$ and $\lambda_4$. Narrowcast signals that are RF frequency multiplexed into broadcast channels are normally much lower in amplitude than broadcast video signals. The arrangement of sending the same broadcast signal and different narrowcast signals over multiple wavelengths (WDM) is a means of providing more segmentation in CATV networks. If both broadcast and narrowcast signals are being transmitted, then transmitter 200 also includes an RF splitter 216 that splits the broadcast signal among the lasers $212_1$, $212_2$, $212_3$, and $212_4$. The lasers 212 also each receive a different narrowcast signal.

The deleterious effects of FWM can be reduced by irregularly distributing the signal wavelengths within a selected waveband (e.g., the 1310 nm window). In particular, by using carefully selected irregular or nonuniform channel spacings instead of a uniform channel spacing, the FWM products that are generated fall outside the bandwidths of the individual signals. This approach to the reduction of FWM can be demonstrating using four signals or channels that have a nominal channel separation of 200 GHz. Of course, the techniques described herein are more generally applicable to any number of channels with many different nominal channel separations. After illustrating the process for channels, a generalization of the process will be presented that can be used in connection with any number of channels.

For purposes of this analysis, the four signals can be represented by $$S(t) = \cos[2\pi f_0 t] + \cos[2\pi (f_0 + \Delta f + \delta_1) t] + \cos[2\pi (f_0 + 2\Delta f + \delta_2) t] + \cos[2\pi (f_0 + 4\Delta f + \delta_3) t]$$

where $f_0$ is the optical carrier frequency of the longest wavelength signal, $\Delta f$ is a standard DWDM channel separation (for example, in the current analysis $\Delta f = 200$ GHz in accordance with ITU DWDM standard). The frequencies $\delta_1$, $\delta_2$, and $\delta_3$ are frequency offsets so that the optical carriers no longer fall on frequencies separated exactly by multiples of $\Delta f$, also ($\delta_1$, $\delta_2$, $\delta_3$) $< \Delta f$.

The resulting four-wave mixing signal is given by (disregarding the absolute amplitudes as only the frequencies are important for this analysis):

$$S_{FWM}(t) = \{\cos[2\pi f_0 t] + \cos[2\pi (f_0 + \Delta f + \delta_1) t] + \cos[2\pi (f_0 + 2\Delta f + \delta_2) t] + \cos[2\pi (f_0 + 4\Delta f + \delta_3)]$$

For a four channel DWDM system operating in the 1310 nm window with the signals defined as above, it turns out there are 48 four-wave mixing terms which can be found by repeatedly applying the appropriate trigonometric identities to the cubed signal $S_{FWM}(t)$. Twenty of these terms fall around the third harmonics of the optical carriers and are therefore not relevant. Of the remaining 28 terms ten are potentially problematic.

Initially channel separations of 200 GHz (f2−f1), 200 GHz (f3−f2), and 400 GHz (f4−f3) were selected with $\delta_1 = \delta_2 = \delta_3 = 0$. This frequency plan does not preclude the generation of frequency terms created by the totally degenerate four-wave mixing process. However, as stated above, there are ten, out of the 28 relevant four-wave mixing terms, which may still cause interference problems with the optical carriers. These ten terms are generated from either the totally degenerate cases or the partially degenerate cases.

Of these ten remaining terms four are generated as a result of the totally degenerate four wave mixing processes. In the case of four optical channels the totally degenerate four-wave mixing processes generates four terms; one falling exactly on each of the four optical carrier frequencies. These terms can never be placed outside of the signal bandwidths. Such terms are always present in any optical transmission situation and are usually not problematic at low to moderate power levels.

In order to ensure that the remaining six terms will fall outside of the DWDM channel filter bandwidths (e.g., ±25 GHz in this example) the optical carrier frequencies must be slightly adjusted from the initially selected values. This is done by determining the appropriate values for the frequency offsets $\delta_1$, $\delta_2$, and $\delta_3$. The six remaining four-wave mixing terms can be placed at least 50 GHz away from the nearest optical carriers by setting $\delta_1$ and $\delta_2$ each equal to 50 GHz (i.e. increasing f2 and f3 each by 50 GHz) This places the terms well outside of the DWDM channel filter bandwidths.

Table 1 lists the relevant frequency expressions involving the optical channels f1, f2, f3 and f4 and $\delta_1$, $\delta_2$, and $\delta_3$. The fourth column of the table shows the displacement between the FWM terms $f_{FWM}$ and the optical carrier frequency fc in terms of the frequency offsets $\delta_1$, $\delta_2$, and $\delta_3$. Two numerical examples are given in the last two columns. In the first example $\delta_1 = 50$ GHz, $\delta_2 = 50$ GHz, and $\delta_3 = 0$ GHz and in the second example $\delta_1 = 25$ GHz, $\delta_2 = 25$ GHz, and $\delta_3 = 0$ GHz. Table 2 lists the optical channel frequency separations for each of these two examples presented in Table 1. Table 3 lists a numerical illustration in the 1310 nm window for each of these two examples. In these examples the carrier signals f1, f2, f3 and f4 are chosen to be 228.745 THz, 228.945 THz, 229.145 THz and 229.545 THz, respectively.

TABLE 1

Relevant frequency expressions including the relationships of the frequency offsets $\delta_1$, $\delta_2$, and $\delta_3$ to the frequency displacement of the four-wave mixing terms relative to each of the optical carriers.

| Optical Channel | Optical Carrier Frequencies ($f_C$) | Closest Four Wave Mixing Frequencies to Each Optical Carrier ($f_{FWM}$) | FWM Displacement Frequency from the Optical Carrier ($f_{FWM} - f_C$) | FWM Displacement Frequencies from the Optical Carrier ($f_{FWM} - f_C$) with $\delta_1 = 50$, $\delta_2 = 50$ $\delta_3 = 0$ (GHz) | FWM Displacement Frequencies from the Optical Carrier ($f_{FWM} - f_C$) with $\delta_1 = 25$, $\delta_2 = 25$, $\delta_3 = 0$ (GHz) |
|---|---|---|---|---|---|
| f1 | $f_0$ | $f_0$ | 0 | 0 | 0 |
|  |  | $f_0 + 2\delta_1 - \delta_2$ | $2\delta_1 - \delta_2$ | 50 | 25 |
|  |  | $f_0 + 2\delta_2 - \delta_3$ | $2\delta_2 - \delta_3$ | 100 | 50 |

TABLE 1-continued

Relevant frequency expressions including the relationships of the frequency offsets $\delta_1$, $\delta_2$, and $\delta_3$ to the frequency displacement of the four-wave mixing terms relative to each of the optical carriers.

| Optical Channel | Optical Carrier Frequencies ($f_C$) | Closest Four Wave Mixing Frequencies to Each Optical Carrier ($f_{FWM}$) | FWM Displacement Frequency from the Optical Carrier ($f_{FWM} - f_C$) | FWM Displacement Frequencies from the Optical Carrier ($f_{FWM} - f_C$) with $\delta_1 = 50$, $\delta_2 = 50$ $\delta_3 = 0$ (GHz) | FWM Displacement Frequencies from the Optical Carrier ($f_{FWM} - f_C$) with $\delta_1 = 25$, $\delta_2 = 25$, $\delta_3 = 0$ (GHz) |
|---|---|---|---|---|---|
| f2 | $f_0 + \Delta f + \delta_1$ | $f_0 + \Delta f + \delta_1$ | 0 | 0 | 0 |
|  |  | $f_0 + \Delta f + \delta_2 - \delta_1$ | $\delta_2 - 2\delta_1$ | -50 | -25 |
| f3 | $f_0 + 2\Delta f + \delta_2$ | $f_0 + 2\Delta f + \delta_2$ | 0 | 0 | 0 |
|  |  | $f_0 + 2\Delta f + \delta_3 - \delta_2$ | $\delta_3 - 2\delta_2$ | -100 | -50 |
|  |  | $f_0 + 2\Delta f + 2\delta_1$ | $2\delta_1 - \delta_2$ | 50 | 25 |
| f3 | $f_0 + 4\Delta f + \delta_3$ | $f_0 + 4\Delta f + \delta_3$ | 0 | 0 | 0 |
|  |  | $f_0 + 4\Delta f + 2\delta_2$ | $2\delta_2 - \delta_3$ | 100 | 50 |

TABLE 2

The optical channel frequency separations for the two examples given in table 1.

| Optical Channel | Optical Carrier Frequencies | Optical Channel Separations with $\Delta f = 200$ and $\delta_1 = 50$, $\delta_2 = 50$, $\delta_3 = 0$ (GHz) | Optical Channel Separations with $\Delta f = 200$ and $\delta_1 = 25$, $\delta_2 = 25$, $\delta_3 = 0$ (GHz) |
|---|---|---|---|
| f1 | $f_0$ |  |  |
| f2 | $f_0 + \Delta f + \delta_1$ | f2 - f1 = 250 | f2 - f1 = 225 |
| f3 | $f_0 + 2 \Delta f + \delta_2$ | f3 - f2 = 200 | f3 - f2 = 200 |
| f4 | $f_0 + 4 \Delta f + \delta_3$ | f4 - f3 = 350 | f4 - f3 = 375 |

TABLE 3

Original optical frequencies chosen for the 1310 DWM and the updated optical frequencies including the offsets.

| Original Optical Carrier Frequencies (THz) | Adjusted Optical Carrier Frequencies (THz) |
|---|---|
| $f_1 = 228.745$ (1310.598 nm) | $f_1 = 228.745$ (1310.598 nm) |
| $f_2 = f_1 + 0.2 = 228.945$ (1309.453 nm) | $f_2 = f_1 + 0.25 = 228.995$, (1309.167 nm): $\delta_1 = 0.05$ |
| $f_3 = f_1 + 0.4 = 229.145$ (1308.310 nm) | $f_3 = f_1 + 0.45 = 229.195$, (1308.025 nm): $\delta_2 = 0.05$ |
| $f_4 = f_1 + 0.8 = 229.545$ (1306.030 nm) | $f_4 = f_1 + 0.8 = 229.545$, (1306.030 nm): $\delta_3 = 0$ |

Figure 5A:
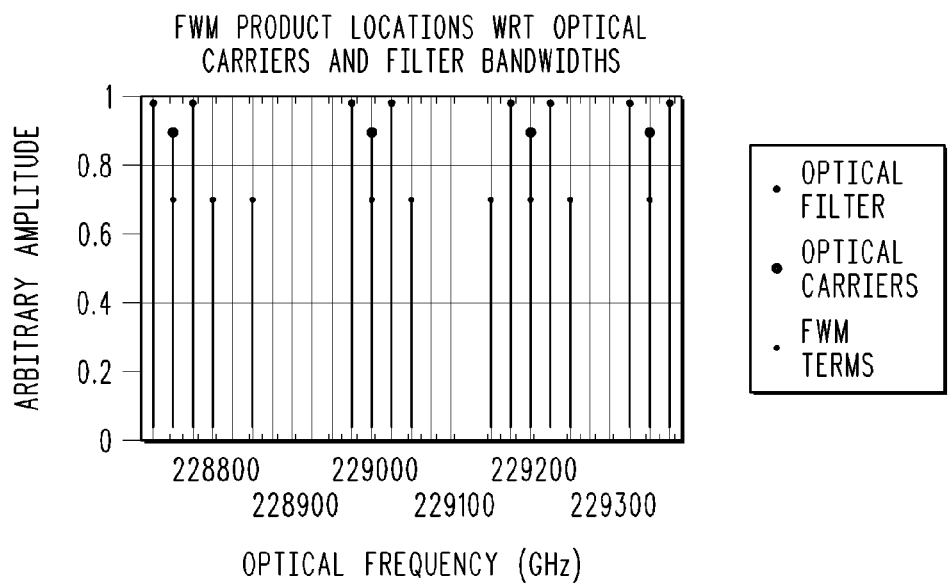
FIGS. 5a and 5b are spectral plots showing examples of a set of four optical channels in the 1310 nm window with irregular channel spacings to reduce crosstalk from FWM and Raman crosstalk.
Figure 5B:
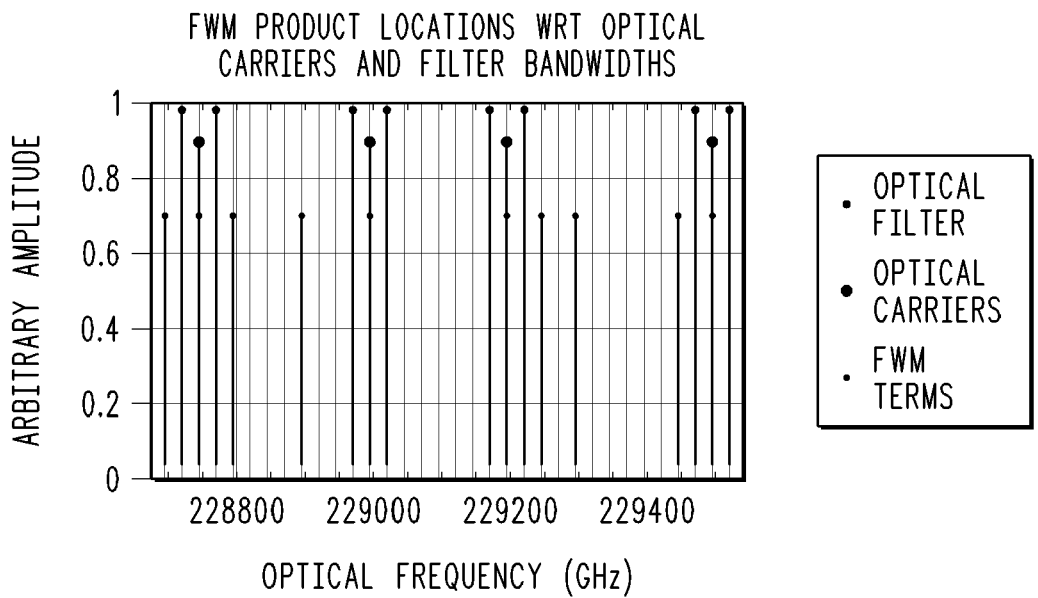
Figure 6:
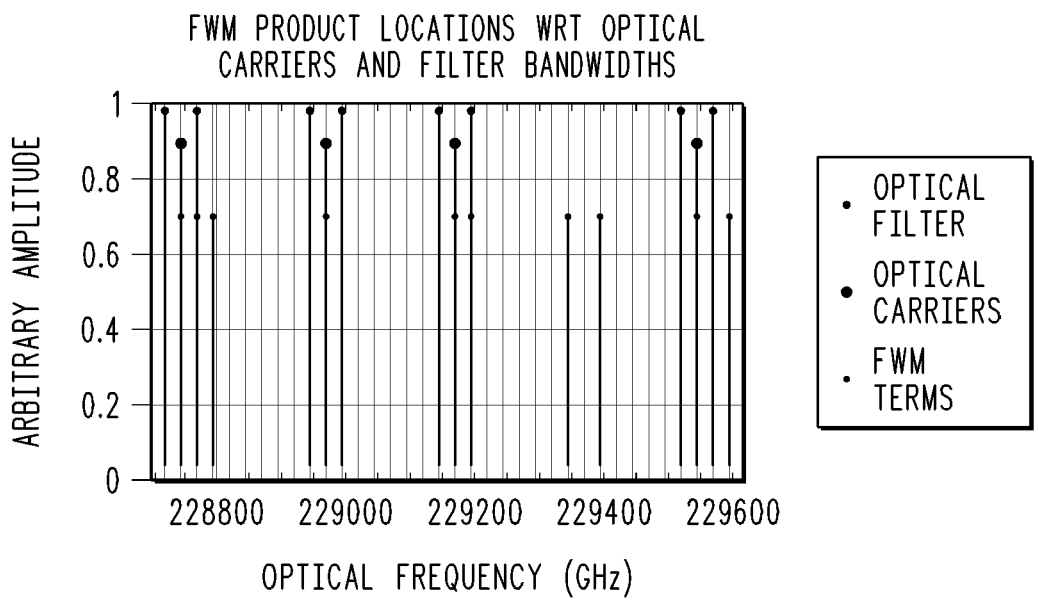
FIG. 6 is a spectral plot showing another example of a set of four optical channels in the 1310 nm window with irregular channel spacings to reduce crosstalk from FWM and Raman crosstalk.

The examples shown in Tables 2 and 3 are plotted in FIGS. 5a and 6. FIG. 5a is a spectral plot showing the frequency placement of the four carrier signals along with the four-wave mixing terms with $\Delta f = 200$ GHz, $\delta_1 = 50$ GHz, $\delta_2 = 50$ GHz, and $\delta_3 = 0$ GHz. FIG. 5b, discussed below, is the same as FIG. 5a except that $\delta_3 = 150$ GHz. In these two examples the closest FWM terms (other than the totally degenerate terms) are at least 50 GHz away from the carriers. FIG. 6 is an spectral plot showing the frequency placement of the four carrier signals along with the four-wave mixing terms with $\Delta f = 200$ GHz, $\delta_1 = 25$ GHz, $\delta_2 = 25$ GHz, and $\delta_3 = 0$ GHz. In this case there are three FWM signals that are located 25 GHz away from the optical carriers, which is just at the edge of the DWDM channel filter bandwidths.

One advantage of using DWDM channel spacings such as shown in FIGS. 5 and 6 is that in addition to reducing crosstalk arising from FWM, Raman crosstalk is also substantially reduced. In contrast, in a CWDM system, for example, the Raman gain is much higher. This is because the DWDM channels are located within a bandwidth of no more than about 1 THz.

Figure 7:
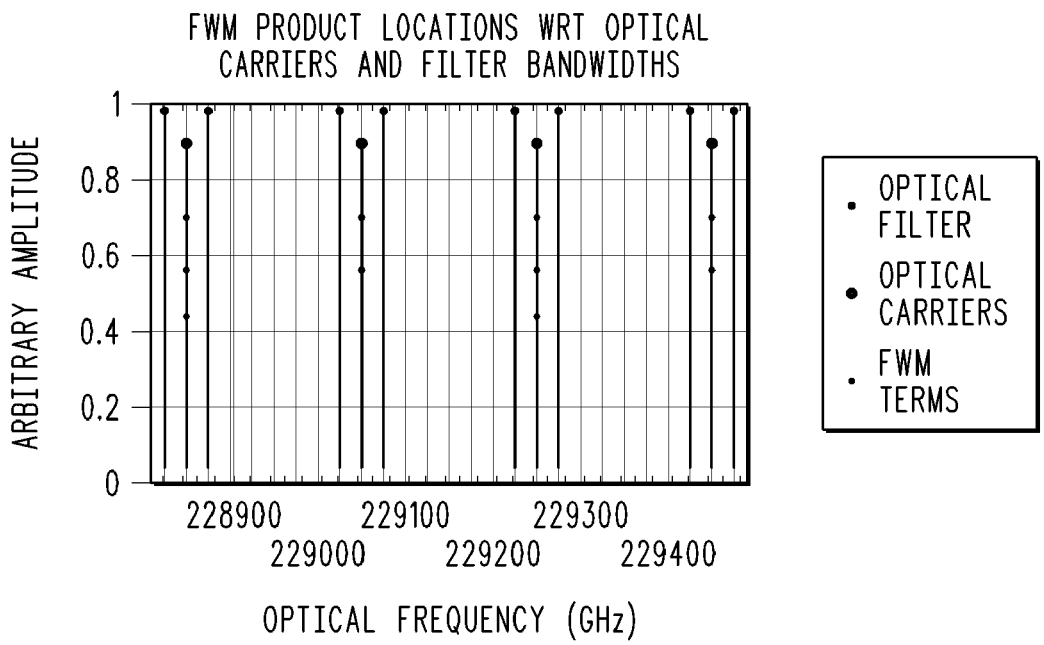
FIG. 7 is a plot showing a set of four optical channels in the 1310 nm window with a regular channel spacing.

Additional sets of channels along with their respective FWM terms are presented in the following examples of FIGS. 7-11. In FIG. 7 the channels have a uniform channel spacing $\Delta f = 200$ GHz and an optical channel filter bandwidth=50 GHz. The shortest channel wavelength is $\lambda_{ref} = 1310.000$ nm. This plot shows the locations of 10 problematic four wave mixing terms, denoted by reference numerals 1-10 (the amplitudes in all these plots are arbitrary and are intentionally displaced to make the terms easier to observe). Three of the four wave mixing terms fall directly on the shortest wavelength $\lambda_{ref}$, two fall directly on the second channel $\lambda_2$, three fall directly on the third channel $\lambda_3$, and two fall directly on the fourth channel $\lambda_4$.

Figure 8:
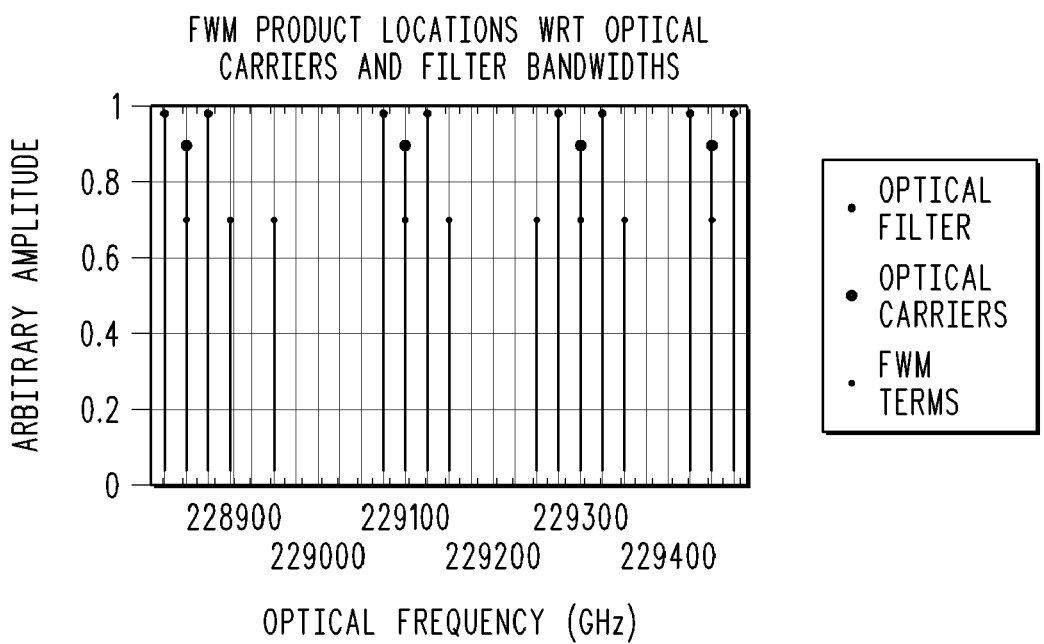
FIGS. 8-11 are showing additional examples of sets of four optical channels in the 1310 nm window with irregular channel spacings to reduce crosstalk from FWM and Raman crosstalk.

FIG. 8 shows an example in which the optical channels have irregular channel spacings ($f_2-f_{ref}=250$ GHz, $f_3-f_2=200$ GHz, $f_4-f_3=150$ GHz) and an optical channel filter bandwidth=50 GHz. The shortest channel wavelength is $\lambda_{ref}=1310.000$ nm. This plot shows the locations of 9 potentially problematic four wave mixing terms.

Figure 9:
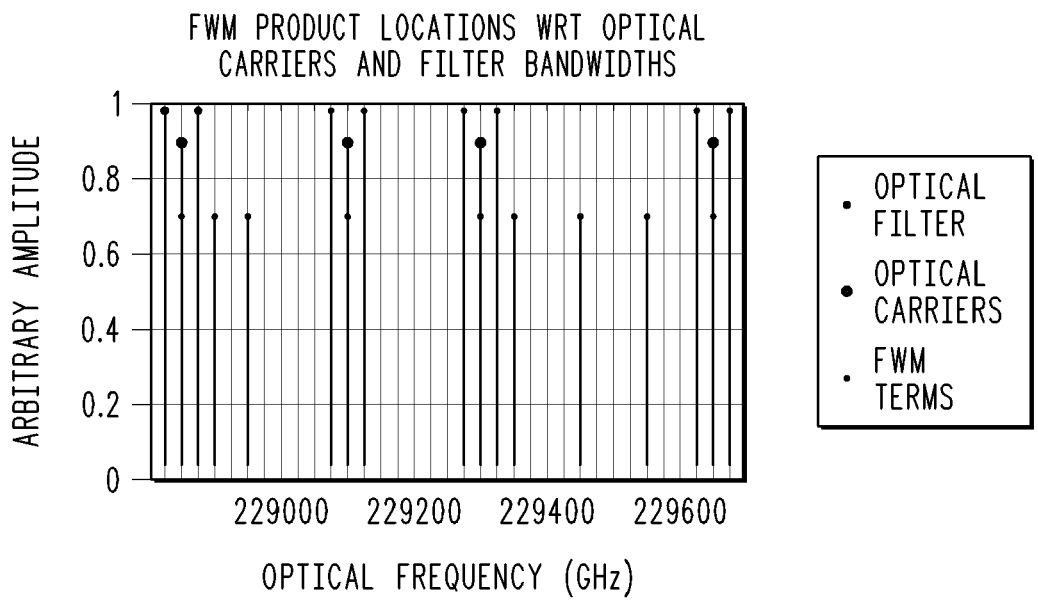

FIG. 9 shows another example in which the optical channels have irregular channel spacings ($f_2-f_{ref}=250$ GHz, $f_3-f_2=200$ GHz, $f_4-f_3=350$ GHz) and an optical channel filter bandwidth=50 GHz. The shortest channel wavelength is $\lambda_{ref}=1310.000$ nm. This plot shows the locations of 9 potentially problematic four wave mixing terms.

Figure 10:
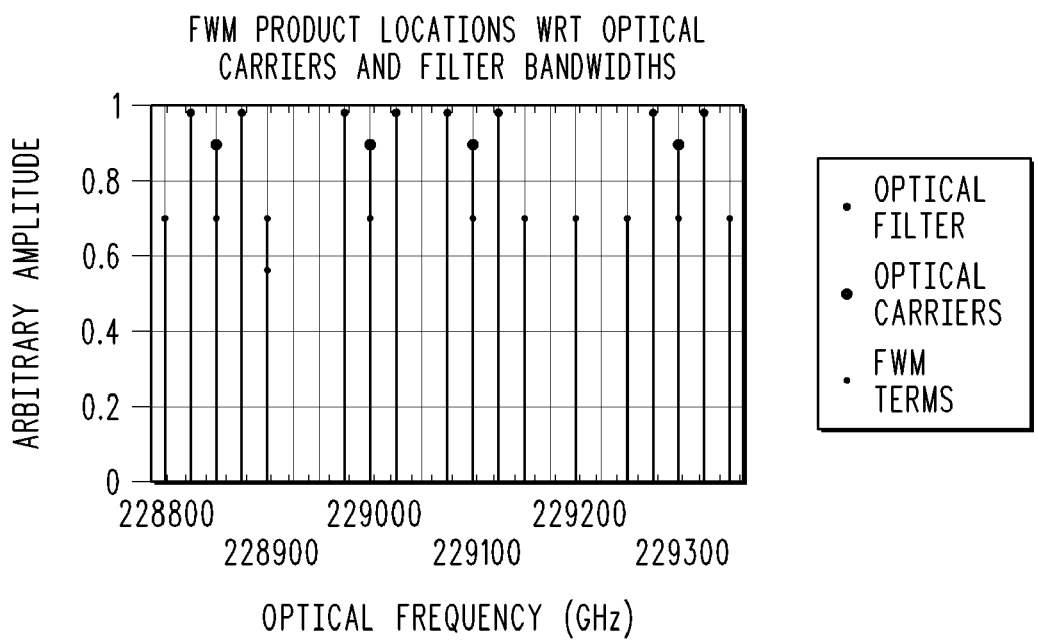

FIG. 10 shows yet another example in which the optical channels have irregular channel spacings ($f_2-f_{ref}=150$ GHz, $f_3-f_2=100$ GHz, $f_4-f_3=200$ GHz) and an optical channel filter bandwidth=50 GHz. Once again, the shortest channel wavelength is $\lambda_{ref}=1310.000$ nm. This plot shows the locations of 11 potentially problematic four wave mixing terms.

Figure 11:
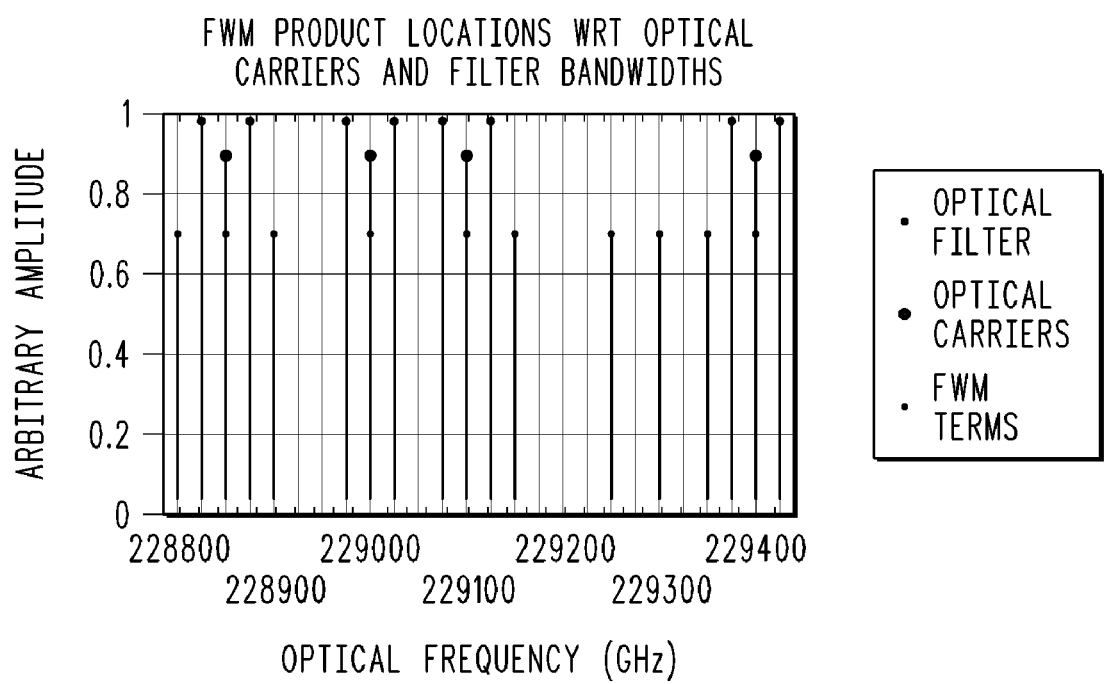

FIG. 11 show another example in which the optical channels have irregular channel spacings ($f_2-f_{ref}=150$ GHz, $f_3-f_2=100$ GHz, $f_4-f_3=300$ GHz) and an optical channel filter bandwidth=50 GHz. The shortest channel wavelength is $\lambda_{ref}=1310.000$ nm. This plot shows the locations of 10 potentially problematic four wave mixing terms.

With the various choices of irregular channel spacings shown in FIGS. 8-11 only the four wave mixing products generated by the unavoidable totally degenerate cases fall directly on the optical carrier frequencies. All of the other four wave mixing terms fall outside of the optical channel filter bandwidths in harmless locations posing no issues to the integrity of the transmitted information.

The previous discussion illustrated the techniques for reducing FWM using four channels. The following analysis will illustrate how these techniques can be generalized to any number of channels.

For purposes of this analysis a system with multiple optical channels can be expressed as:

$$S(t) = \sum_{i=1}^{n} \cos[2\pi(f_{ref} + (i-1)\Delta f + \delta f_i)t] \quad (1)$$

where i is the channel index number, n is the number of optical channels in the system, $f_{ref}$ is the reference frequency (i.e. the lowest optical carrier frequency in the system), $\Delta f$ is a standard frequency interval for the channel spacing, $\delta f_i$ are the nonstandard frequency offsets, and t is time.

In DWDM (dense wavelength division multiplexed) optical communication systems $\Delta f$ is typically either 50 GHz, 100 GHz, 200 GHz or even 400 GHz. In some cases channel separations as small as 25 GHz are also coming into use. The optical carrier frequency of the signal in the ith channel is given by:

$$f_i=f_{ref}+(i-1)\Delta f+\delta f_i \quad (2)$$

If we require that:

$$\delta f_1=0 \quad (3)$$

then:

$$f_1=f_{ref} \quad (4)$$

Furthermore if we also require the frequency spacing $\Delta f$ and frequency offsets $\delta f_i$ to be positive or zero:

$$\Delta f \geq 0 \text{ and } \delta f_i \geq 0 \quad (5)$$

Then the optical carrier frequencies in (2) are ordered according to their index number:

$$f_1=f_{ref}<f_2<f_3\ldots<f_n \quad (6)$$

The four wave mixing terms arise as a result of the third order nonlinearity in the fiber. Cubing (1) gives:

$$[S(t)]^3 = \sum_{i=1}^{n}\sum_{j=1}^{n}\sum_{k=1}^{n} \cos[2\pi f_i t]\cos[2\pi f_j t]\cos[2\pi f_k t] \quad (7)$$

Using appropriate trigonometric identities gives:

$$[S(t)]^3 = \frac{1}{4}\sum_{i=1}^{n}\sum_{j=1}^{n}\sum_{k=1}^{n} \left\{ \begin{array}{l} 3\cos[2\pi(f_i+f_j-f_k)t]+ \\ \cos[2\pi(f_i+f_j+f_k)t] \end{array} \right\} \quad (8)$$

The second term within the curly brackets in (8) represents the sum frequency terms which occur at frequencies in the vicinity of $3f_{ref}$ (approximately at ⅓ the reference wavelength). These terms are not problematic in a typical DWDM system. Therefore we may ignore this term and concentrate only on the first term within the curly bracket which produces spectral components that fall in the DWDM optical frequency band of interest. Using (2) this term becomes:

$$S_{FWM}(t) \equiv \sum_{i=1}^{n}\sum_{j=1}^{n}\sum_{k=1}^{n} \frac{3}{4}\cos\left[2\pi\left(\begin{array}{c}f_{ref}+(i+j-(k+1))\Delta f+\\ \delta f_i+\delta f_j-\delta f_k\end{array}\right)t\right] \quad (9)$$

The frequencies of the four wave mixing terms are given by:

$$f_{i,j,k}^{FWM}=f_{ref}+(i+j-(k+1))\Delta f+\delta f_i+\delta f_j-\delta f_k \quad (10a)$$

Notice that:

$$f_{i,i,i}^{FWM} = f_{ref}+(i-1)\Delta f+\delta f_i \quad (10b)$$
$$= f_i$$

So that for the totally degenerate four wave mixing cases (i=j=k), the terms fall directly on the DWDM signals themselves. Those of skill in the art will appreciate that they are usually small enough in magnitude so as not to pose too much of a problem.

The indices i, j, and k range in value from 1 through n therefore:

$$f_{1,1,n}^{FWM} \leq f_{i,j,k}^{FWM} \leq f_{n,n,1}^{FWM} \quad (11a)$$

Or:

$$[f_{ref}+(1-n)\Delta f+2\delta f_1-\delta f_n] \leq f_{i,j,k}^{FWM} \leq [f_{ref}+2(n-1)\Delta f+ 2\delta f_n-\delta f_1] \quad (11b)$$

This may be further simplified using (3):

$$[f_{ref}+(1-n)\Delta f-\delta f_n] \leq f_{i,j,k}^{FWM} \leq [f_{ref}+2(n-1)\Delta f+2\delta f_n] \quad (11c)$$

The four wave mixing terms range over a spectrum that is three times the spectral occupancy of the DWDM signals themselves.

$$f_{n,n,1}^{FWM}-f_{1,1,n}^{FWM}=3(f_n-f_1) \quad (12)$$

Therefore, only a subset of these terms present a problem in that they may fall too close to and therefore interfere with any one of the original DWDM signals which are transmitting various types of information to the users of the system. We are thus interested in the four wave mixing terms which fall closest to any of the DWDM signal frequencies. We may examine the $m^{th}$ signal. Using (2) and (10a) The frequency separation between the $m^{th}$ DWDM signal and the four wave mixing terms are given by:

$$\Delta F_{i,j,k}^{m}=f_m-f_{i,j,k}^{FWM}=(m+k-i-j)\Delta f+\delta f_m+\delta f_k-\delta f_i-\delta f_j \quad (13)$$

where $1 \leq m \leq n$. If i=j=k=m, clearly the frequency separation is zero which corresponds to the totally degenerate case also given by (10b). Other than the totally degenerate case the closest four wave mixing terms to $f_m$ occur when the following condition is satisfied:

$$m=i+j-k \quad (14)$$

Now notice that with the restriction (14), if i or j is equal to k then, it follows that j or i is equal to m. Hence we also have for the partially degenerate and totally degenerate cases:

$$\Delta F_{m,j,j}{}^m = \Delta f_{i,m,i}{}^m = \Delta F_{m,m,m}{}^m = 0 \qquad (15)$$

Therefore, the totally degenerate and partially degenerate four wave mixing terms which are closest to the DWDM optical carrier frequencies fall directly on these frequencies and cannot easily be removed. Hence we concentrate on ensuring that the completely non-degenerate four wave mixing terms (i.e. i≠j≠k) fall outside of the optical filter passbands for each DWDM channel in the system.

Referring to (13) it reduces to:

$$\Delta F_{i,j,k}{}^m = \delta f_m + \delta f_k - \delta f_i - \delta f_j \text{ with } m = i+j-k, i \neq j \neq k \qquad (16)$$

We can then eliminate the k index by using (14):

$$\Delta F_{i,j,(i+j-m)}{}^m = \delta f_m + \delta f_{(i+j-m)} - \delta f_i - \delta f_j \text{ with } m \neq i \neq j \qquad (17a)$$

Furthermore because the indices refer to the channel numbers according to (1) we must also impose the additional condition that:

$$1 \leq i+j-m \leq n \text{ with } m \neq i \neq j \qquad (17b)$$

Typically in a channelized system, such as the WDM systems being discussed here, the optical signals are separated from one another at various switching sites within the communication network or at the optical receiver terminal sites so that the correct information can be transmitted to the proper consumer. This channel separation is usually accomplished by means of optical bandpass filters. Each filter has a given bandwidth of B and their respective bandwidths are centered on one of the n DWDM optical carrier frequencies $f_i$. In order that no interference occur amongst the DWDM signals Each of the DWDM optical carrier frequencies must be separated from its nearest neighbors by at least B, the optical passband filter bandwidths. This can be accomplished by simply requiring that the standard frequency interval between the signals, $\Delta f$, be greater than B.

$$\Delta f > B \qquad (18)$$

The frequency offsets of the four wave mixing terms, $\Delta F_{i,j,k}{}^m$, are determined with respect to the $m^{th}$ optical carrier which, in-turn, is located at the center of its respective optical passband filter response. Therefore, in order to ensure that the generated four wave mixing terms do not fall within the passbands of the optical filters the magnitudes of the $\Delta F_{i,j,k}{}^m$ must be greater than B/2.

$$|\Delta F_{i,j,k}^m| > \frac{B}{2} \qquad (19a)$$

Using (16) this becomes:

$$|\delta f_m + \delta f_k - \delta f_i - \delta f_j| > \frac{B}{2} \qquad (19b)$$

Or using (17):

$$|\delta f_m + \delta f_{(i+j-m)} - \delta f_i - \delta f_j| > \frac{B}{2} \qquad (19c)$$

where:

$$1 \leq i + j - m \leq n$$

and $$m \neq i \neq j$$

Clearly if the signals are equally spaced so that $\delta f_m = \delta f_k = \delta f_i = \delta f_j$ then the inequities (19) cannot be true. Hence one condition (although not sufficient) that needs to be satisfied in order that the four wave mixing terms fall outside of the optical filter passbands is that the channels must not be equally spaced. If the frequency offsets, $\delta f_i$, are rewritten as:

$$\delta f_i \equiv a_i \frac{B}{2} \qquad (20)$$

Where the $\alpha_i$ are positive (or zero) scaling factors. Then condition (19c) can be expressed as:

$$|a_m + a_{(i+j-m)} - a_i - a_j| > 1 \text{ where: } 1 \leq i+j-m \leq n \text{ and } m \neq i \neq j \qquad (21)$$

Also from (3):

$$\alpha_1 = 0 \qquad (22)$$

So long as condition (21) is satisfied for each of the frequency offsets as defined by (20) then the non-degenerate four wave mixing products will fall outside of the optical filter bandwidths. Also note that because (19c) and (21) are symmetric in the indices i and j that we need only consider unique pairs of (i,j) when performing the analysis. That is, in so far as the placement of non-degenerate four wave mixing products is concerned (i,j) gives the same result as (j,i).

For example, in a four wavelength system the unique (i,j) index pairings are given by the 10 pairs:

| (1, 1) | (1, 2) | (1, 3) | (1, 4) |
|--------|--------|--------|--------|
|        | (2, 2) | (2, 3) | (2, 4) |
|        |        | (3, 3) | (3, 4) |
|        |        |        | (4, 4) |

Using equation 17(b), for each value of m the allowed values of i+j are given in table 4 along with the corresponding pairs of indices (i,j).

TABLE 4

Scaling Parameter Index Values (All Cases)

| M | All Allowed i + j Values | Corresponding (i, j) |
|---|--------------------------|----------------------|
| 1 | 2, 3, 4, 5 | (1, 1), (1, 2), (1, 3), (2, 2), (1, 4), (2, 3) |
| 2 | 3, 4, 5, 6 | (1, 2), (1, 3), (2, 2), (1, 4), (2, 3), (2, 4), (3, 3) |
| 3 | 4, 5, 6, 7 | (1, 3), (2, 2), (1, 4), (2, 3), (2, 4), (3, 3), (3, 4) |
| 4 | 5, 6, 7, 8 | (1, 4), (2, 3), (2, 4), (3, 3), (3, 4), (4, 4) |

TABLE 5

Scaling Parameter Index Values (Totally Non-Degenerate Cases m ≠ i ≠ j)

| M | Non Degenerate i + j Values | Corresponding (i, j) |
|---|------------------------------|----------------------|
| 1 | 5 | (2, 3) |
| 2 | 4, 5 | (1, 3), (1, 4) |
| 3 | 5, 6 | (1, 4), (2, 4) |
| 4 | 5 | (2, 3) |

Table 4 shows, for a particular value of m, all of the allowed i+j values and the corresponding values of the i and j indices. Table 5 isolates only the totally non-degenerate cases. For the four channel system there are six non-degenerate four wave mixing terms that are distinct and potentially problematic. Additionally, the partially degenerate and totally degenerate terms will generate terms falling directly on the four DWDM channel frequencies. Hence, in a four channel system there are 6 problematic, and distinct, non-degenerate frequency terms in addition to the indistinct partially degenerate and totally degenerate terms which fall directly on the 4 optical carrier frequencies. This gives a total of 10 distinct four wave mixing frequencies which may fall within the bandwidths of the optical channel filters:

TABLE 6

Number of Distinct Problematic Four Wave Mixing Frequencies

| m | Indistinct Degenerate On-Carrier FWM Frequencies | Distinct Non-Degenerate Four Wave Mixing Frequencies | Total Number of Distinct Four Wave Mixing Frequencies |
|---|---|---|---|
| 1 | 1 | 1 | 2 |
| 2 | 1 | 2 | 3 |
| 3 | 1 | 2 | 3 |
| 4 | 1 | 1 | 2 |

Table 6 summarizes the number of distinct problematic four wave mixing frequencies which occur near each carrier of a four channel DWDM system.

Table 5 can be used with (21) to define the frequency offset scaling parameter value inequalities:

| | | |
|---|---|---|
| $\|a_4 - a_2 - a_3\| > 1$ | (1, 2, 3) | (23a) |
| $\|2a_2 - a_3\| > 1$ | (2, 1, 3) | (23b) |
| $\|a_2 + a_3 - a_4\| > 1$ | (2, 1, 4) | (23c) |
| $\|a_3 + a_2 - a_4\| > 1$ | (3, 1, 4) | (23d) |
| $\|2a_3 - a_2 - a_4\| > 1$ | (3, 2, 4) | (23e) |
| $\|a_4 - a_2 - a_3\| > 1$ | (4, 2, 3) | (23f) |

In (23) the value in parentheses next to each inequality corresponds to the values of the indices (m, i, j) used to generate the inequality. Also (22) was used to simplify the expressions. Notice that (23a) is the same as (23c), (23d) and (23f). Then three remaining independent equations that remain are:

| | | |
|---|---|---|
| $\|a_4 - a_2 - a_3\| > 1$ | (1, 2, 3) | (23a) |
| $\|2a_2 - a_3\| > 1$ | (2, 1, 3) | (23b) |
| $\|2a_3 - a_2 - a_4\| > 1$ | (3, 2, 4) | (23e) |

Any values of $\alpha_2$, $\alpha_3$, and $\alpha_4$ which satisfy these three inequalities (along with $\alpha_1=0$) will generate non-degenerate four wave mixing terms that fall outside of the optical channel filter bandwidths and will not interfere with the transmission of the information being transmitted by the DWDM optical carriers.

One such solution is:

$$\alpha_1=0, \alpha_2=2, \alpha_3=2, \alpha_4=0 \quad (24)$$

Then if the optical channel filters bandwidths are each 50 GHz wide the corresponding frequency offsets are using (20):

$$\delta f_1=0, \delta f_2=50, \delta f_3=50, \delta f_4=0 \text{GHz} \quad (25)$$

In fact, for $\alpha_2=\alpha_3=2$ inequalities (23a,b,e) will each be satisfied for any value of $\alpha_4$ which satisfies either of:

$$0 \leq \alpha_4 \leq 1 \text{ or } \alpha_4 > 5 \quad (26a)$$

Implying that the frequency offset $\delta f_4$ should satisfy either of:

$$0 \leq \delta f_4 < 25 \text{GHz or } \delta f_4 > 125 \text{GHz} \quad (26b)$$

The solutions presented in equations 26a and 26b for a system with 4 channels corresponds to the solutions depicted in FIGS. 5a and 5b, which were discussed above.

As a second example consider the three channel case. Using equation 17(b), all of the unique (i,j) index pairings are given by the 6 pairs:

| | | |
|---|---|---|
| (1, 1) | (1, 2) | (1, 3) |
| | (2, 2) | (2, 3) |
| | | (3, 3) |

TABLE 7

Scaling Parameter Index Values (All Cases)

| m | All Allowed i + j Values | Corresponding (i, j) |
|---|---|---|
| 1 | 2, 3, 4 | (1, 1), (1, 2), (1, 3), (2, 2), |
| 2 | 3, 4, 5 | (1, 2), (1, 3), (2, 2), (2, 3) |
| 3 | 4, 5, 6 | (1, 3), (2, 2), (2, 3), (3, 3) |

TABLE 8

Scaling Parameter Index Values (Totally Non-Degenerate Cases)

| m | Non Degenerate i + j Values | Corresponding (i, j) |
|---|---|---|
| 1 | NONE | NONE |
| 2 | 4 | (1, 3) |
| 3 | NONE | NONE |

In this case only the m=2 channel has a non-degenerate term that can be placed outside of the channel filter bandwidth by satisfying the single inequality:

$$|2a_2 - a_3| > 1 \quad (2, 1, 3) \quad (27)$$

So that either:

$$0 \leq \alpha_3 < 2\alpha_2 - 1 \text{ or } \alpha_3 > 2\alpha_2 + 1 \quad (28)$$

So that if $\alpha_2=1$ then:

$$0 \leq \alpha_3 < 1 \text{ or } \alpha_3 > 3 \quad (29a)$$

Hence the frequency offsets are then (for 50 GHz channel filter bandwidths):

$$\delta f_1=0, \delta f_2=25 \text{ and } 0 \leq \delta f_3 \leq 25 \text{ or } \delta f_3 \geq 75 \text{ GHz} \quad (29b)$$

As a final example, consider the five channel case. All of the unique (i,j) index pairings are given by the 15 pairs:

| | | | | |
|---|---|---|---|---|
| (1, 1) | (1, 2) | (1, 3) | (1, 4) | (1, 5) |
| | (2, 2) | (2, 3) | (2, 4) | (2, 5) |
| | | (3, 3) | (3, 4) | (3, 5) |
| | | | (4, 4) | (4, 5) |
| | | | | (5, 5) |

TABLE 9

Scaling Parameter Index Values (All Cases)

| m | All Allowed i + j Values | Corresponding (i, j) |
|---|---|---|
| 1 | 2, 3, 4, 5, 6 | (1, 1), (1, 2), (1, 3), (2, 2), (1, 4), (2, 3), (1, 5), (2, 4), (3, 3) |
| 2 | 3, 4, 5, 6, 7 | (1, 2), (1, 3), (2, 2), (1, 4), (2, 3), (1, 5), (2, 4), (3, 3) |
| 3 | 4, 5, 6, 7, 8 | (1, 3), (2, 2), (1, 4), (2, 3), (1, 5), (2, 4), (3, 3), (2, 5), (3, 4), (3, 5), (4, 4) |
| 4 | 5, 6, 7, 8, 9 | (1, 4), (2, 3), (1, 5), (2, 4), (3, 3), (2, 5), (3, 4), (3, 5), (4, 4), (4, 5) |
| 5 | 6, 7, 8, 9, 10 | (1, 5), (2, 4), (3, 3), (2, 5), (3, 4), (3, 5), (4, 4), (4, 5), (5, 5) |

TABLE 10

Scaling Parameter Index Values (Totally Non-Degenerate Cases)

| m | Non Degenerate i + j Values | Corresponding (i, j) |
|---|---|---|
| 1 | 5, 6 | (2, 3), (2, 4) |
| 2 | 4, 5, 6 | (1, 3), (1, 4), (1, 5) |
| 3 | 5, 6, 7 | (1, 4), (1, 5), (2, 4), (2, 5) |
| 4 | 5, 6, 7, 8 | (2, 3), (1, 5), (2, 5), (3, 5) |
| 5 | 6, 7 | (2, 4), (3, 4) |

TABLE 11

Number of Distinct Problematic Four Wave Mixing Frequencies

| m | Indistinct Degenerate On-Carrier FWM Frequencies | Distinct Non-Degenerate Four Wave Mixing Frequencies | Total Number of Distinct Four Wave Mixing Frequencies |
|---|---|---|---|
| 1 | 1 | 2 | 3 |
| 2 | 1 | 3 | 4 |
| 3 | 1 | 4 | 5 |
| 4 | 1 | 4 | 5 |
| 5 | 1 | 2 | 3 |

Table 11 shows that there are 15 distinct non-degenerate four wave mixing frequencies in addition to the 5 indistinct degenerate terms which fall on the DWDM carrier frequencies for a total of 20 problematic four wave mixing frequencies that arise in a five channel system.

Next using the information in table 10 along with (21) and (22) form the inequality expressions for the 15 nondegenerate cases:

$$|a_4 - a_2 - a_3| > 1 \quad (1, 2, 3) \quad (30a)$$

$$|a_5 - a_2 - a_4| > 1 \quad (1, 2, 4) \quad (30b)$$

$$|2a_2 - a_3| > 1 \quad (2, 1, 3) \quad (30c)$$

$$|a_2 + a_3 - a_4| > 1 \quad (2, 1, 4) \quad (30d)$$

$$|a_2 + a_4 - a_5| > 1 \quad (2, 1, 5) \quad (30e)$$

$$|a_3 + a_2 - a_4| > 1 \quad (3, 1, 4) \quad (30f)$$

$$|2a_3 - a_5| > 1 \quad (3, 1, 5) \quad (30g)$$

$$|2a_3 - a_2 - a_4| > 1 \quad (3, 2, 4) \quad (30h)$$

$$|a_3 + a_4 - a_2 - a_5| > 1 \quad (3, 2, 5) \quad (30i)$$

$$|a_4 - a_2 - a_3| > 1 \quad (4, 2, 3) \quad (30j)$$

$$|a_4 + a_2 - a_5| > 1 \quad (4, 1, 5) \quad (30k)$$

$$|a_4 + a_3 - a_2 - a_5| > 1 \quad (4, 2, 5) \quad (30l)$$

$$|2a_4 - a_3 - a_5| > 1 \quad (4, 3, 5) \quad (30m)$$

$$|a_5 - a_2 - a_4| > 1 \quad (5, 2, 4) \quad (30n)$$

$$|a_5 + a_2 - a_3 - a_4| > 1 \quad (5, 3, 4) \quad (30o)$$

Keeping only the unique expressions leaves the following:

$$|a_4 - a_2 - a_3| > 1 \quad (1, 2, 3) \quad (30a)$$

$$|a_5 - a_2 - a_4| > 1 \quad (1, 2, 4) \quad (30b)$$

$$|2a_2 - a_3| > 1 \quad (2, 1, 3) \quad (30c)$$

$$|2a_3 - a_5| > 1 \quad (3, 1, 5) \quad (30g)$$

$$|2a_3 - a_2 - a_4| > 1 \quad (3, 2, 4) \quad (30h)$$

$$|a_3 + a_4 - a_2 - a_5| > 1 \quad (3, 2, 5) \quad (30i)$$

$$|2a_4 - a_3 - a_5| > 1 \quad (4, 3, 5) \quad (30m)$$

One possible solution can be found by letting $\alpha_3=1$ and $\alpha_5=0$ then letting $\alpha_2=2$, $\alpha_4=5$:

$$\alpha_1=0, \alpha_2=2, \alpha_3=1, \alpha_4=5, \alpha_5=0 \quad (31a)$$

So that for a system employing optical channel filters with 50 GHz bandwidths the corresponding frequency offsets are:

$$\delta f_1=0, \delta f_2=50, \delta f_3=25, \delta f_4=125, \delta f_5=0 \quad (31b)$$

Figure 12:
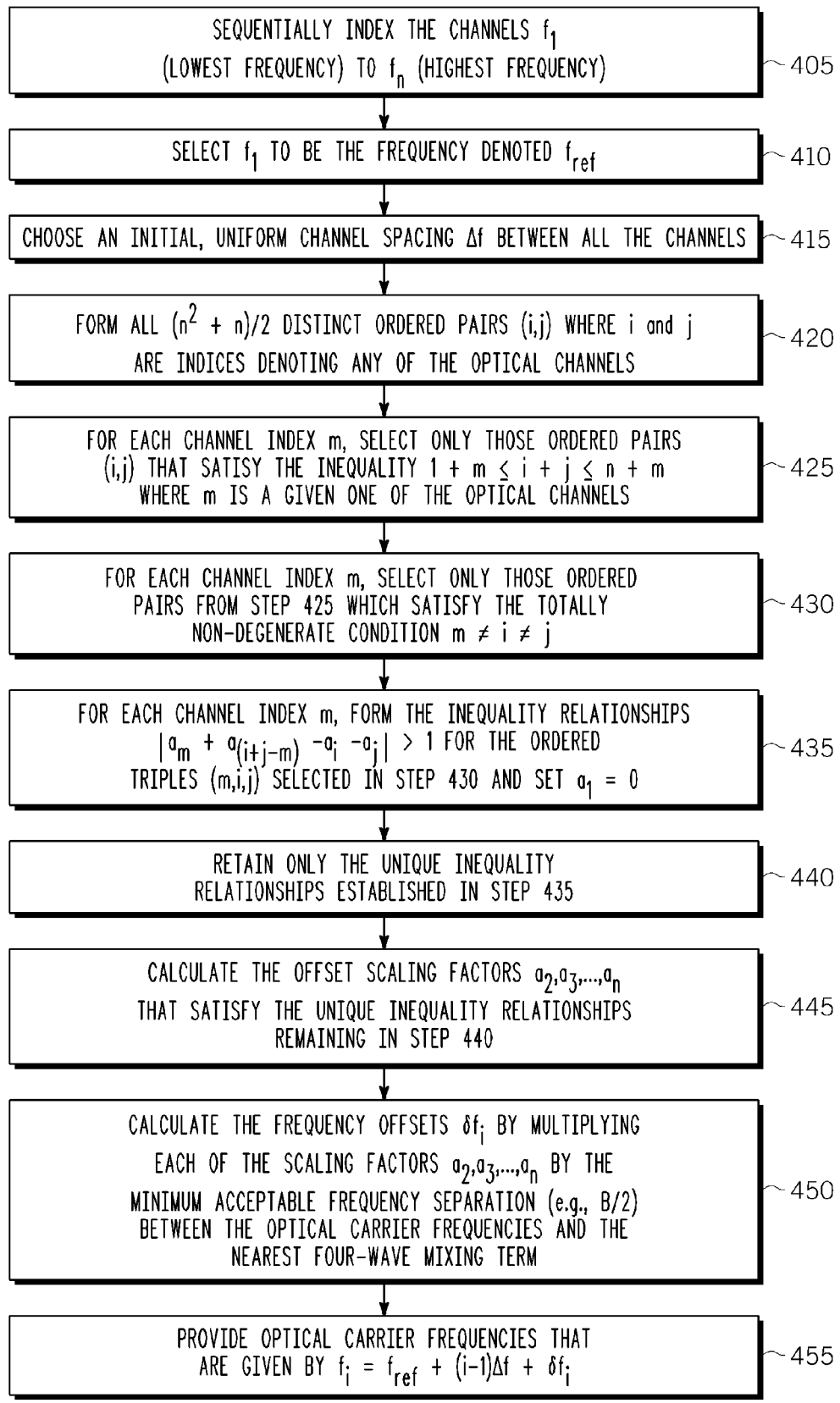
FIG. 12 is a flowchart showing one particular procedure for selecting the channel spacings in a WDM system having n optical carrier channels so that FWM is reduced.

FIG. 12 is a flowchart showing one particular procedure for implementing the techniques described above for appropriately selecting the channel spacings in a system having n optical carrier channels so that FWM is reduced.

The method begins in step 405 by sequentially indexing the number of optical carriers (channels) in the system from $f_1$ through $f_n$ in order from the lowest to the highest approximate frequencies (i.e., longest to shortest wavelength). The indices i, and j denote any of the optical channels $f_1$ through $f_n$, and the index m denotes a given one of the optical channels.

In step 410 the lowest optical frequency is chosen to have a fixed value denoted the reference frequency $f_{ref}$.

In step 415 an initial, uniform, standardized frequency spacing $\Delta f$ (without offsets) is chosen between all of the optical carriers.

In step 420, all the distinct ordered pairs of the channel indices (i,j) are formed. For a system with n channels there are $(n^2+n)/2$ such unique pairs. This includes the "diagonal" i=j pairs.

In step 425 only those ordered pairs of indices (i,j) are selected for which the restriction of equation (17b) is satisfied for all of the allowed values of the sums of the indices i and j for the $m^{th}$ channel. That is, for each m, select those ordered pairs (i,j) such that $1+m \leq i+j \leq n+m$, where $1 \leq i \leq n$ and $1 \leq j \leq n$ (as in the examples presented in Tables 4, 7, and 9).

In step 430, for each value of m, select only those ordered pairs of indices (i,j) determined in step 425 that satisfy the totally non-degenerate condition m≠i≠j i.e., none of the three indices are the same. (as in the examples presented in Tables 5, 8 and 10).

Having determined all of the pertinent non-degenerate index triples (m,i,j) for each channel m in the preceding steps, in step 435 use the inequality relationships presented in equation 21, $|\alpha_m + \alpha_{(i+j-m)} - \alpha_i - \alpha_j| > 1$, to form all of the inequality relationships for the system. In addition, choose $\alpha_1 = 0$ (as in equation 22) to simplify the set of inequality relationships.

In step 440, reduce the set of inequalities from step 435 by retaining only the unique inequality relationships, disregarding any duplicates or their equivalents (i.e. the negative expressions).

In step 445, determine the remaining frequency offset scaling factors $\alpha_2, \alpha_3, \ldots, \alpha_n$, which satisfy all of the inequality relationships set forth in step 440. Although not necessary, in some cases it may be convenient to require the frequency offset scaling factors to be positive integers or zero.

In step 450 calculate the frequency offsets $\delta f_i$ by multiplying each of the scaling factors determined in step 445 by the minimum acceptable frequency separation between the optical carrier frequencies and the nearest four-wave mixing term. This value might simply be B/2 where B is the bandwidth of the optical channel filters used in the system.

Finally, in step 455, the optical carrier frequencies are determined in accordance with the equation $f_i = f_{ref} + (i-1)\Delta f + \delta f_i$. Channels located at these frequencies relegate the non-degenerate four-wave mixing products to locations that will not interfere with the system performance.

The processes described above, including but not limited to those shown in FIG. 12, may be implemented in a general, multi-purpose or single purpose processor. Such a processor will execute instructions, either at the assembly, compiled or machine-level, to perform that process. Those instructions can be written by one of ordinary skill in the art following the description of FIG. 12 and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

A method and apparatus has been described for reducing four-wave mixing in an optical transmitter that can be used in a variety of WDM and DWDM optical networks. In particular, precisely selected wavelengths are utilized which force the FWM terms that are generated to lie far enough away from the desired signals so that they will not corrupt the information being transmitted by these signals. The technique described herein is readily applicable to optical transmitters that generate optical channels having wavelengths located at or near the zero dispersion wavelength of the transmission path through which they travel.

The invention claimed is:

1. A method of transmitting a WDM optical signal, comprising:
   modulating a plurality of optical channels that are each located at a different wavelength from one another with a respective one of a plurality of information-bearing electrical signals, wherein channel spacings between adjacent ones of the plurality of optical channels are selected such that the optical channels give rise to selected FWM terms that lie outside a channel bandwidth of the optical channels;
   multiplexing each of the modulated optical channels to form a WDM optical signal; and
   forwarding the WDM optical signal onto an optical transmission path,
   wherein the channel spacings between each channel i and its adjacent channel is equal to a constant frequency offset plus a frequency offset $\delta f_i$, wherein the frequency offset $\delta f_i$ is $$\delta f_i \equiv a_i \frac{B}{2},$$

where B/2 is a minimum acceptable frequency separation and $\alpha_i$ is a scaling factor that satisfies the inequality conditions $|\alpha_m + \alpha_{(i+j-m)} - \alpha_i - \alpha_j| > 1$ where $1 \leq i+j-m \leq n$, $m \neq i \neq j$, n is the number of optical channels, and i and j are indices denoting any of the optical channels between channel 1 and channel n, which, along with a given one of the optical channels m, produce the selected FWM terms.

2. The method of claim 1 wherein the selected FWM terms include completely non-degenerate FWM products.

3. The method of claim 1 wherein the optical channels are centered about a wavelength of 1550 nm.

4. The method of claim 1 wherein $\alpha_1 = 0$.

5. The method of claim 4 wherein the scaling factor $\alpha_i$ satisfies only unique ones of the inequality conditions $|\alpha_m + \alpha_{(i+j-m)} - \alpha_i - \alpha_j| > 1$.

6. The method of claim 5 wherein all values of the scaling factor $\alpha_i$ are equal to zero or a positive integer.

7. The method of claim 1 wherein B is equal to the channel bandwidth of the optical channels.

8. The method of claim 1 wherein the optical transmission path is located in a HFC network.

9. The method of claim 1 wherein the optical transmission path is located in a CATV transmission network.

10. The method of claim 1 wherein the optical transmission path is located in a PON.

11. The method of claim 1 wherein the optical channels are located at wavelengths at or near a zero dispersion wavelength of the transmission path.

12. The method of claim 11 wherein the optical channels are centered about a wavelength of 1310 nm.

13. At least one computer-readable medium encoded with instructions which, when executed by a processor, performs a method including:
   selecting an initial set of channel spacings between at least three optical channels to be employed in a WDM system; and
   adjusting the initial set of channel spacings so that the optical channels give rise to completely non-degenerate FWM products that lie outside a channel bandwidth of each of the optical channels,
   wherein the three optical channel comprise n optical channels denoted channels f1, f2, f3 . . . fn, from lowest to highest in frequency, and i and j are indices denoting any of the optical channels between channel 1 and channel n, which, along with a given one of the optical channels m, produce the selected FWM terms and further comprising:
   determining selected non-degenerate index triples (m,i,j) for each optical channel m; and
   adjusting the channel spacings such that a frequency separation between the $m^{th}$ signal and the FWM products arising from each of the selected triples (m,i,j) is greater than a minimum acceptable frequency separation, wherein f1 is located at a predetermined fixed frequency $f_{ref}$ and frequencies f2, f3 ... fn are located at frequencies determined in accordance with $f_i=f_{ref}+(i-1)\Delta f+\delta f_i$ where $2<i\leq n$, $\Delta f$ is a fixed frequency interval, and $\delta f_i$ is a frequency offset, wherein the frequency offset $\delta f_i$ is $$\delta f_i \equiv a_i \frac{B}{2},$$

number B/2 is a minimum acceptable frequency separation and $\alpha_i$ is a scaling factor that satisfies the inequality conditions $|\alpha_m+\alpha_{(i+j-m)}-\alpha_i-\alpha_j|>1$ where $1\leq i+j+m\leq n$ and $m\neq i\neq j$.

14. The computer-readable medium of claim 13 wherein the selected non-degenerate index triples (m,i,j) are determined by forming all $(n^2+n)/2$ distinct ordered pairs of channel indices (i,j) and selecting only those channel indices (i,j) that satisfy the relation $1+m\leq i+j\leq n+m$ and $m\neq i\neq j$.

15. The computer-readable medium of claim 13 wherein $\alpha_1=0$.

16. The computer-readable medium of claim 15 wherein the scaling factor $\alpha_i$ satisfies only unique ones of the inequality conditions a $|\alpha_m+\alpha_{(i+j-m)}-\alpha_i-\alpha_j|>1$.

17. The computer-readable medium of claim 16 wherein all values of the scaling factor $\alpha_i$ are equal to zero or a positive integer.

18. The computer-readable medium of claim 13 wherein B is equal to the channel bandwidth of the optical channels.

19. The computer-readable medium of claim 13 wherein the optical channels are located in a bandwidth centered around 1310 nm.

20. The computer-readable medium of claim 13 wherein the optical channels are located in a bandwidth centered around 1550 nm.

21. A WDM optical transmitter, comprising:
a plurality of optical sources for generating optical channels located at different wavelengths;
a plurality of optical modulators each having a first input for receiving a respective one of a plurality of information-bearing electrical signals and an output coupled to an input of a respective one of the plurality of optical sources to thereby provide a plurality of modulated optical channels, wherein channel spacings between adjacent ones of the plurality of optical channels are selected such that the optical channels give rise to selected FWM terms that lie outside a channel bandwidth of the optical channels; and
a multiplexer coupled to the plurality of optical sources to receive and combine the modulated optical channels to produce a multiplexed optical signal
wherein the channel spacings between each channel i and its adjacent channel is equal to a constant frequency offset plus a frequency offset $\delta f_i$, wherein the frequency offset $\delta f_i$ is $$\delta f_i \equiv a_i \frac{B}{2},$$

where B/2 is a minimum acceptable frequency separation and $\alpha_i$ is a scaling factor that satisfies the inequality conditions $|\alpha_m+\alpha_{(i+j-m)}-\alpha_i-\alpha_j|>1$ where $1\leq i+j-m\leq n\_m\neq i\neq j$, is the number of optical channels, and i and j are indices denoting any of the optical channels between channel 1 and channel n, which, along with a given one of the optical channels m, produce the selected FWM terms.

22. The WDM optical transmitter of claim 21 wherein the selected FWM terms include completely non-degenerate FWM products.

23. The WDM optical transmitter of claim 21 wherein $\alpha_1=0$.

24. The WDM optical transmitter of claim 23 wherein the scaling factor $\alpha_i$ satisfies only unique ones of the inequality conditions $|\alpha_m+\alpha_{(i+j-m)}-\alpha_i-\alpha_j|>1$.

25. The WDM optical transmitter of claim 24 wherein all values of the scaling factor $\alpha_i$ are equal to zero or a positive integer.

26. The WDM optical transmitter of claim 21 wherein B is equal to the channel bandwidth of the optical channels.

27. The WDM optical transmitter of claim 21 wherein the optical channels are located at wavelengths at or near a zero dispersion wavelength of the transmission path.

28. The WDM optical transmitter of claim 21 wherein the optical channels are located in a bandwidth centered around 1310 nm.

* * * * *